: 3,223,730
PREPARATION OF SULFONE DIACETIC ACID
Garson P. Shulman, St. Louis Park, William J. McKillip, Bloomington, and Freeman M. Young, Richfield, Minn., assignors to Archer-Daniels-Midland Company, Minneapolis, Minn., a corporation of Delaware
No Drawing. Filed May 3, 1963, Ser. No. 277,716
4 Claims. (Cl. 260—537)

This invention relates to the preparation of a dibasic acid and more particularly to a novel method of preparing sulfone diacetic acid and a novel intermediate therefor.

Sulfone diacetic acid is a known compound. Its preparation is described by Staudinger and Ritzenthaler in Chem. Ber., 68A, 455 (1935). The usefulness of sulfone diacetic acid as a chelating agent is described in J. Chem. Soc., vol. 57, 1367 (1915).

Sulfone diacetic acid would have many potential commercial uses if it were available at a reasonable price. Known methods of making the compound are so expensive that the material has present application only for laboratory reagent purposes and specialty uses where a high cost can be tolerated.

It is an object of this invention to provide an improved method for the preparation of sulfone diacetic acid. It is another object of this invention to provide an improved process for the preparation of 2,5-dihydrosulfolene diacetic acid using sulfolene as a starting material. It is a further object of this invention to provide a highly economical method of preparing sulfone diacetic acid. It is still another object of this invention to provide a sulfone diacetic acid which is adaptable to commercial scale preparation. It is still a further object of this invention to provide a novel intermediate for the preparation of sulfone diacetic acid. Other objects will appear hereinafter.

The objects of this invention are accomplished by a process which comprises treating 2,5-dihydrosulfolene with ozone to form sulfolene ozonide, treating the sulfolene ozonide with hydrogen peroxide while in contact with an acid catalyst, and recovering sulfone diacetic acid formed thereby. In accordance with the present invention we have discovered that sulfolene can be converted to sulfone diacetic acid cheaply and in good yields using sulfolene ozonide as the intermediate.

The two reactions involved in the process of the present invention are illustrated by the following equations:

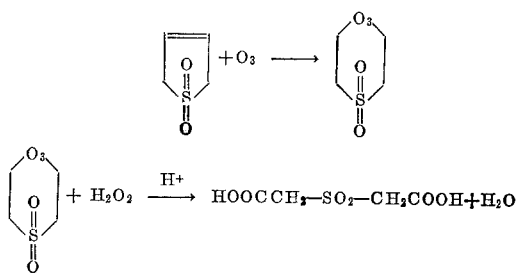

The mechanism of the reactions and the structure of the sulfolene ozonide intermediate are not completely understood. Most probably, in solution in glacial acetic acid the intermediate sulfolene ozonide is a mixture of the classical ozonide shown above and a peroxide material containing acetic acid (a hemiperacylal). When the sulfolene ozonide is isolated a crystalline solid results. This would indicate that one particular structure predominates. It is customary to refer to such a product, which is probably a mixture, as an ozonide. Infrared analysis seems to indicate that the present sulfolene ozonide is predominantly a hemiperacylal. We have been unable to propose a theory of the conversion of the ozonide to the sulfone diacetic acid which satisfactorily explains the many peculiarities of the reaction.

The reaction of the 2,5-dihydrosulfolene and ozone is carried out under typical ozonization conditions for alkenes. In most cases it is preferred to carry out the reaction in a suitable solvent. Generally, the solvents heretofore used in the ozonization of olefins can be employed. We prefer to use glacial acetic acid or other low molecular weight organic acid, such as, propionic acid or formic acid. At room temperature, 2,5-dihydrosulfolene is soluble to the extent of about 10% by weight in glacial acetic acid. If desired, the 2,5-dihydrosulfolene reactant can be employed in higher concentrations if it is in finely divided form and slurried in the glacial acetic acid. Using this technique, concentrations of 50% or higher of the 2,5-dihydrosulfolene can be used. Water and methanol are not good solvents because when they are employed side reactions tend to predominate. If the slurry type of reaction is employed, the choice of solvents is considerably greater. For example, such things as dimethyl formamide, cyclohexane, dodecane, benzene, xylene and toluene can be used. Even though these last three materials contain unsaturation, their reactivity with ozone occurs at a very slow rate compared to the reactivity of the 2,5-dihydrosulfolene with ozone.

Ozonized air or ozonized oxygen are the preferred sources of ozone for the ozonization involved in the reaction of the present invention. Commercial equipment of various sizes is available for ozonizing air or oxygen. The ozone is formed from oxygen by the action of silent electrical discharge. The concentration of ozone in the ozonized air or oxygen should be about 1 to 15% by volume.

The reaction is conveniently carried out at about room temperature. However, if desired, higher or lower temperatures may be employed.

The sulfolene ozonide intermediate can be isolated from the solution by precipitation with a solvent pair, or preferably, by evaporating the solution to dryness.

The hydrolysis of the sulfolene ozonide to the sulfone diacetic acid is carried out by adding to the solution or slurry of the sulfolene ozonide approximately an equimolar amount of hydrogen peroxide and small amount of an acid catalyst. Care should be taken to prevent the decomposition of the hydrogen peroxide. Although the hydrogen peroxide acts as an oxidizing agent in the hydrolysis of the ozonide, premature or excessive oxidation causes the reaction mixture to turn to a black or purple tar-like substance. For example, if a platinum catalyst is added to decompose hydrogen peroxide, a tar-like substance will form. Similarly, if an ozone-sulfuric acid-oxygen system is used to oxidize and hydrolyze the ozonide, a tar-like substance containing sulfone diacetic acid is formed. Isolation of crystalline material from the tar is extremely difficult. Thus, while hydrogen peroxide provides the desired product in excellent yields, other oxidants which might be thought to be equivalent were relatively ineffective. It was also found that hydrolysis without oxidation followed by an oxidation step was completely ineffective.

The acid which is employed in the hydrolysis as a catalyst must be a strong mineral or organic acid. Suitable acids include hydrochloric, sulfuric, phosphoric, nitric, formic, trichloroacetic, and the like.

The invention will be better understood with reference to the following examples which are illustrations of certain preferred embodiments of the present invention. Unless otherwise indicated all parts and percentages used herein are by weight.

Example I

Into a 1,000 ml. stirred flask was charged a solution of 50 grams of 2,5-dihydrosulfolene dissolved in 500 ml. of acetic acid. For a period of five hours and 24 minutes, 0.2 cubic ft. per minute (c.f.m.) of ozonized oxygen was passed through the solution. The ozonized oxygen delivered 63 mg. of oxygen per minute to the solution. There was then added 35 ml. of 50% hydrogen peroxide and 25 ml. of 1 molar sulfuric acid. This mixture was stirred 90 minutes, and the solvent was removed by distillation until 400 ml. of distillate had been collected. The pot residue was cooled and the crystals which formed were filtered, washed with benzene, and dried. There was obtained 70 grams of sulfone diacetic acid having a melting point of 184° C., with decomposition, and an equivalent weight of 91.6 (91.0 theoretical). The acid dissociation constant, first ionization, was about $3.2 \times 10^{-3}$. The compound was soluble in water, dimethyl formamide, acetic acid, tetrahydrofuran, and methanol. The compound was insoluble in benzene and petroleum ether. The compound can be recrystallized from glacial acetic acid. Recrystallization from methanol frequently yields mono and di-esters.

Example II

Into a 5 liter stirred flask was charged a slurry of 274 grams of 2,5-dihydrosulfolene in 2.5 liters of acetic acid. A stream of ozonized oxygen containing 60 mg. per minute of ozone was passed into the reaction flask. The exit gas from the reaction flask was passed through a potassium iodide solution. When the potassium iodide in the trap turned dark, approximately 46 hours, the ozonization was discontinued and 150 ml. of one molar sulfuric acid and 300 ml. of 50% hydrogen peroxide were added. The mixture was stirred for 24 hours, and then the excess peroxide was decomposed by a platinum black. Water and acetic acid were removed by distillation until the pot temperature reached 125°. Black, tarry crystals which formed on cooling were recrystallized using a tetrahydrofuran-benzene solvent pair and then a methanol-benzene solvent pair. The resultant white, crystalline product melted at 181° C. with decomposition, and infrared analysis indicated the presence of sulfone and carboxylic acid groups.

Example III

Into 50 grams glacial acetic was dissolved 2.5 grams 2,5-dihydrosulfolene. Ozonized oxygen containing 57 mg. per min. of ozone was passed through the solution for 16 minutes. The resulting mixture was filtered, poured into 150 ml. of benzene and evaporated to dryness. There resulted a white crystalline solid which melted at 95 to 110° C. with decomposition. While the structure of the ozonide is not completely understood, an infrared analysis showed a broad peroxidic hydroxyl band at 2.75 to 3.5 microns, an ester band at 5.65 microns and a sulfone band at 7.6 and 8.9 microns. The sulfolene ozonide was insoluble in water, soluble in acetic acid, and sparingly soluble in chloroform.

Example IV

The sulfolene ozonide was prepared according to the procedure of Example I. After addition of 25 ml. of 1 molar sulfuric acid, ozonized oxygen delivering 60 mg./min. of ozone was bubbled through the solution for 90 minutes. Purification according to the procedure of Example I gave 65 grams of a black, tarry solid. The infrared spectrum was substantially the same as that of sulfone diacetic acid, and after several recrystallizations, about a 25% yield of grey crystalline solid having a melting point of 175–184° C. and an equivalent weight of 89 was obtained.

The process of the present invention is useful in preparing sulfone diacetic acid which, in turn, is useful as a chelating agent and as a component in plasticizers. Sulfolene ozonide is useful as an intermediate in the production of sulfone diacetic acid.

The specific embodiments in which an exclusive property or privilege is claimed are defined as follows:

1. Process which comprises treating a glacial acetic acid solution of 2,5-dihydrosulfolene with ozonized oxygen until the solution will no longer absorb ozone, treating the resulting mixture with hydrogen peroxide and an acid catalyst selected from the group consisting of a strong mineral acid and a strong organic acid, removing by distillation at least a portion of the water and acetic acid present, cooling the residue, and recovering the sulfone diacetic acid crystals formed thereby.

2. The process comprising treating 2,5-dihydrosulfolene with ozone, treating the resulting ozonized reaction mixture with hydrogen peroxide in the presence of an acid catalyst selected from the group consisting of a strong mineral acid and a strong organic acid, and recovering the resulting sulfone diacetic acid.

3. The process comprising treating 2,5-dihydrosulfolene in glacial acetic acid with ozones, treating the resulting ozonized reaction mixture with hydrogen peroxide in the presence of an acid catalyst selected from the group consisting of a strong mineral acid and a strong organic acid, and recovering the resulting sulfone diacetic acid.

4. The process according to claim 1, wherein said acid catalyst is sulfuric acid.

References Cited by the Examiner

Backer et al., Rec. Trav. Chim., vol. 56 (1937), page 1072.

Backer et al., Rec. Trav. Chim., vol. 61 (1942), page 799 and 800.

Staudinger et al., Berichte, vol. 68 (1935), pages 465–471.

Zuydewijn, Rec. Trav. Chim., vol. 56 (1937), pages 1047–1062.

WALTER A. MODANCE, *Primary Examiner.*

JOHN D. RANDOLPH, *Examiner.*

JAMES A. PATTEN, *Assistant Examiner.*